April 10, 1928.
E. A. WALTERS
TIRE CARRIER
Filed May 12, 1926
1,665,647
2 Sheets-Sheet 1
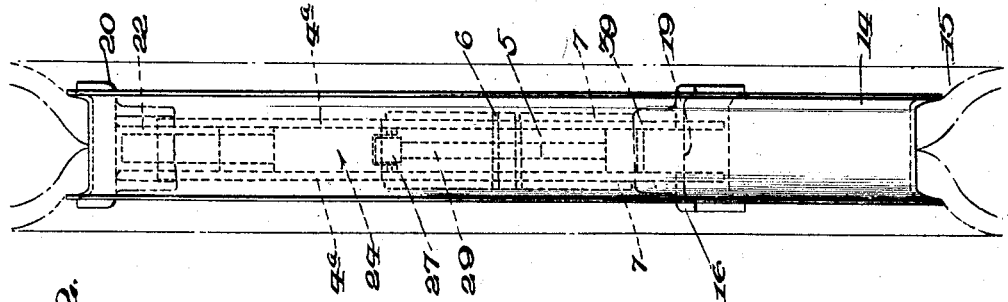
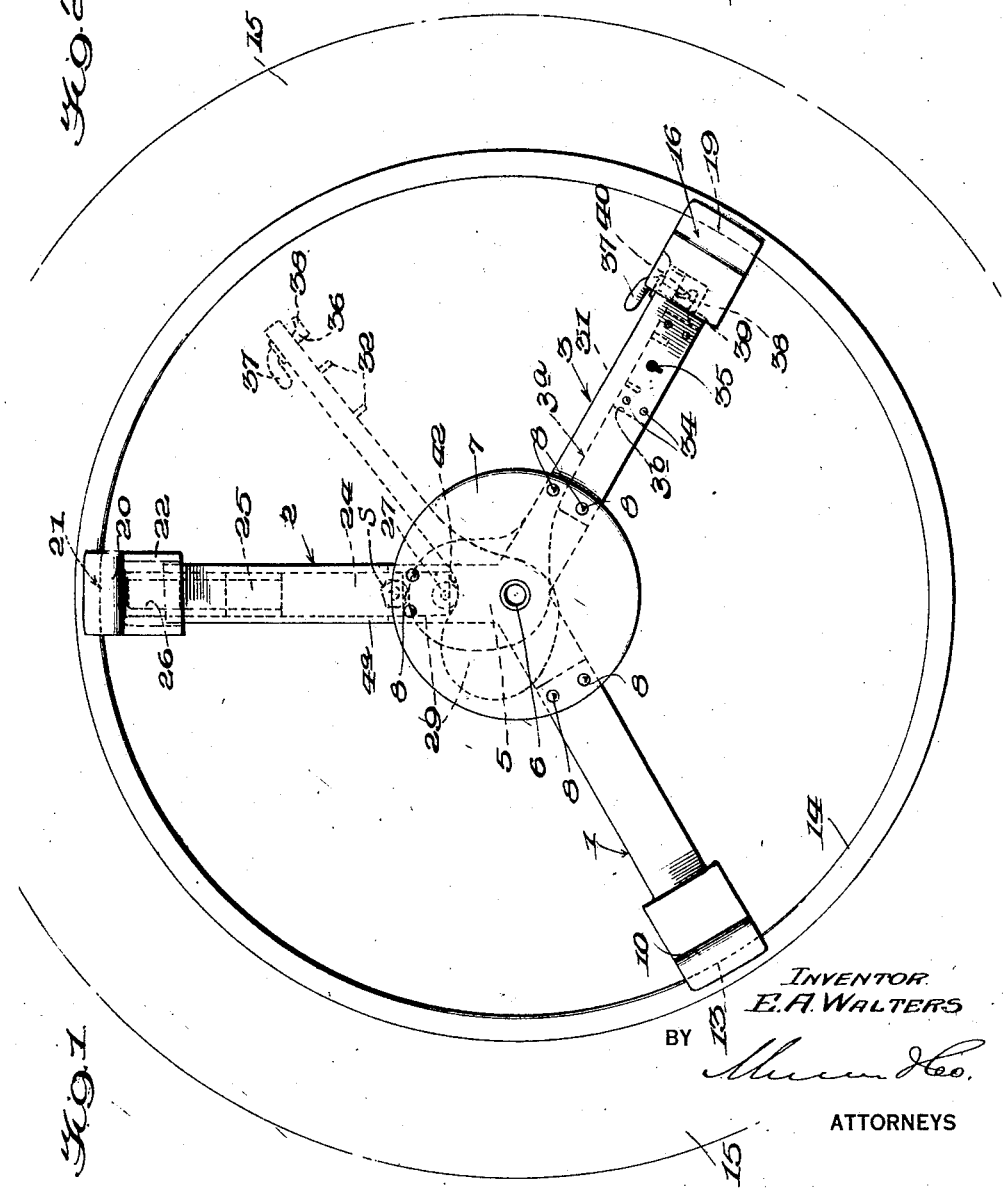
INVENTOR
E. A. WALTERS
BY
ATTORNEYS April 10, 1928.
E. A. WALTERS
TIRE CARRIER
Filed May 12, 1926
1,665,647
2 Sheets-Sheet 2
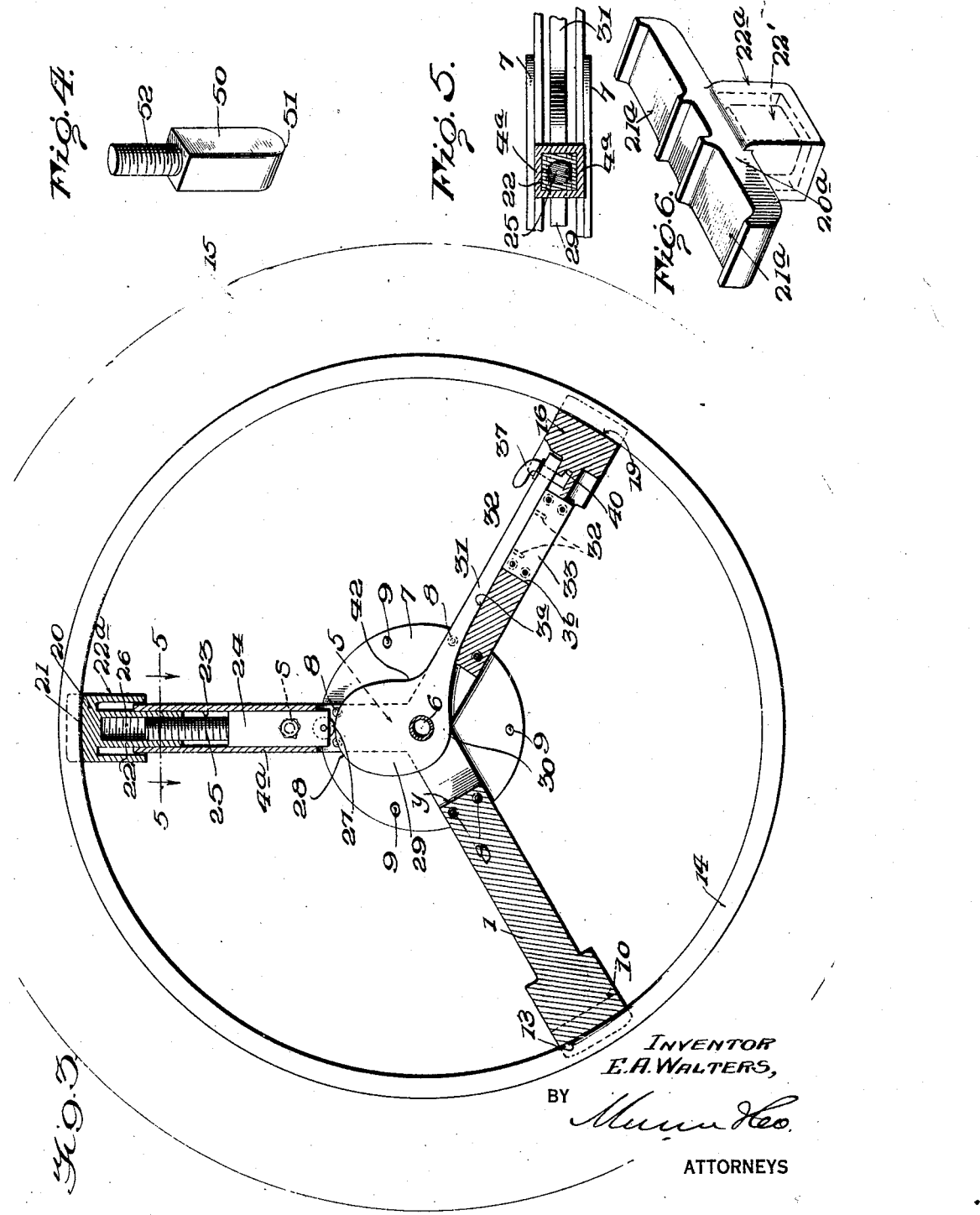

Patented Apr. 10, 1928.

1,665,647

UNITED STATES PATENT OFFICE.

EDWARD A. WALTERS, OF YOUNGSTOWN, OHIO.

TIRE CARRIER.

Application filed May 12, 1926. Serial No. 108,651.

My invention relates to improvements in carriers for spare tires, for automobiles, and it consists in the combinations, constructions and arrangements herein described and claimed.

More specifically defined, the present invention relates to spare tire carriers, of that class which comprise a plurality of supporting arms radiating from a common center and having means at their outer ends for engaging with a tire supporting rim.

An object of the invention is the provision of a tire carrier of the character described having a longitudinally extensible and contractile supporting arm, and simple, reliable and conveniently operable means for adjusting the length of the extensible and contractile supporting arm and for maintaining the desired adjustment of length of the longitudinally extensible and contractile supporting arm.

A further object of the invention is the provision of a tire carrier of the character described having means for positively locking the extensible and contractile arm of the device in position to cooperate with other supporting arms of the device to hold a tire supporting rim firmly in place on the outer ends of the supporting arms.

Other objects and advantages of the invention will be apparent from the following description, considered in conjunction with the accompanying drawings, in which Figure 1 is a side view of a tire carrier embodying the invention, showing a tire supporting rim held in place on the carrier, Figure 2 is an edge view of the structure shown in Fig. 1, Figure 3 is a side elevation of the tire and rim, showing the tire carrier in vertical section, Figure 4 is a perspective view of a modified form of one of the sections of the expansible and contractile supporting arms of the device, Figure 5 is a section through the longitudinally extensible and contractile supporting arm shown in Figures 1 to 3 inclusive, the view being taken substantially along the line 5—5 of Figure 3, and Figure 6 is a perspective view of the rim engaging head and elements of the movable section of the extensible arm for a modified form of the device.

The improved tire carrier comprises three supporting arms respectively indicated in general at 1, 2 and 3. These supporting arms are rigidly connected with one another at their inner ends and radiate from a common center in uniformly spaced relation so that adjacent supporting arms subtend an angle of approximately 120°. The length of the arms 1 and 3 may be constant. The arm 2 is constructed in the manner presently to be described so as to be capable of longitudinal adjustment within a considerable range so that the effective length of the arm 2 can be varied from a length less than that of each of the arms 1 and 3 to a length equal to or even greater than that of each of the arms 1 and 3. The arms 1 and 3 of the construction shown in the drawings are connected rigidly with each other at their inner ends and also with a stationary shank section $4^a$ of the longitudinally extensible and contractile arm 2 by a hub 5. The hub 5 is provided with an axial opening in which an axle 6 is secured in any suitable known manner. The inner end portions of corresponding members 1, 3 and $4^a$ are additionally connected with one another and are stayed to each other by circular hub plates 7, each of which is disposed flatwise against the inner end portions of the corresponding members 1, 3 and $4^a$ in concentric relation to the hub 5 and is secured to the inner end portions of the adjacent members 1, 3 and $4^a$ by rivets 8. It will be observed that these rivets 8 extend through the plates 7 adjacent to the outer edges of the plates and that the plates are shown as having circular openings at their centers for the reception of the extremities of the axle 6. The plates 7 are of considerable area and therefore the rivets 8 will be connected with the adjacent members 1, 3 and $4^a$ at considerable distances from the axis of the hub 5 and a relatively strong and well braced frame structure thus will be provided at the center of the device. One of the plates 7 may be provided with suitable apertures, as at 9, for the reception of bolts or like fastening devices for securing the frame of the device to a supporting bracket on the frame of an automobile or to other supporting member no support for the device being shown in the drawing.

The supporting arm 1 includes a rim engaging head 10 joined to its shank integrally or in any other suitable known manner. The outer face of the head 10 is curved concavely transversely thereof as indicated at 13 to conform to the transverse curvature of the inner wall of a rim 14 of conventional construction and shape, the rim 14 being adapted to support a tire casing 15 thereon in the usual manner.

The supporting arm 3 also has a rim engaging head, indicated at 16, at its outer end. The head 16 is connected integrally or otherwise with its shank and the head 16 likewise is curved concavely transversely thereof as indicated at 19 to provide a seat for a portion of the rim 14.

The arm 2 also has a rim engaging head, indicated at 20 having a seat at 21 in its outer face similar to the seats 13 and 19 for the reception of a portion of the rim 14. The head 20 is carried at the outer end of a movable and longitudinally adjustable shank section of the arm 2. This movable shank section includes a tubular section 22 which may be square or otherwise non-circular in cross sectional outer configuration. The head 20 also has a non-circular sleeve portion $22^a$ which fits slidably over the outer end of the shank $4^a$. The section $4^a$ of the arm 2 is formed with a longitudinal bore or guideway 23 which conforms in cross section to the cross sectional configuration of the member 22 in which the member 22 may slide. The member 22 preferably is integral with the head 20. The movable section of the supporting arm 2 also includes an inner end member 24 which conforms in cross sectional configuration to the cross sectional configuration of the guideway 23 and is adapted to slide in the guideway 23. The inner end member 24 of the movable section of the arm 2 has an axially extending reduced shank portion or stem 25 at its outer end provided with external screw threads for engaging with screw threads on the inner wall or bore 26 of the member 22. The effective length of the movable section of the arm 2 therefore can be varied within the limits set by the lengths of the shank 25. It of course will be understood that the member 24 will be moved outward in the guideway 23 until the member 22 is disposed entirely beyond the outer end of the guideway before the adjustment of length of the movable section of the arm 2 is effected and that the engagement of the non-circular shank 22 and member 24 with the inner wall of the guide-way 23 will effectually prevent accidental turning movement of the shanks 25 and 26. A set screw S may be provided for securing the member 24 and therefore the movable section of the arm 2 to the stationary section $4^a$ of the arm 2 when the extensible arm 2 is in contracted position.

The inner end member 24 of the movable section of the arm 2 may be provided at its inner end with a roller 27 having its periphery in contact with the convexly curved edge 28 of a cam 29 which constitutes a relatively short arm of an angle lever 30 which is fulcrumed on the axle 6 and is movable in a transverse slot Y, in the hub 5. The lever 30 also includes a handle or relatively long arm 31 which forms an angle of approximately 120° with the longitudinal median line of the camming arm 29 of the lever and is adapted to be disposed in a longitudinal slot $3^a$ in the arm 3 when the longitudinal median line of the camming arm 29 is in position to extend along the longitudinal median line of the arm 2. The handle 31 of the lever 30 carries a pair of lateral projections 32 adapted when the handle has been swung to position in the slot $3^a$ to enter a lock casing 33 and to engage with a key-controllable lock bolt, not shown, within the lock casing. The lock casing 33 is secured in a transverse aperture $3^b$ in the arm 3 at the outer end of the slot $3^a$ by rivets 34 and is provided with a key-hole opening 35 for the reception of a key, not shown, for actuating the aforesaid lock bolts, also not shown, to release the projections 32 when it is desired to swing the lever handle 31 from the position shown in Figure 3 and from the lower position in Figure 1 to the raised dotted line position of Figure 1. The outer end portion of the handle 31 carries a pivoted latch bolt 6 having a handle portion 37 at its outer end and having a laterally turned lug 38 at its opposite end, the latch bolt 36 being adapted to enter a mortise or recess 39 in the arm 3 when the handle 37 has been actuated to turn the lug 38 laterally. When the handle 37 has been manipulated to turn the lug 38 radially outward, the beveled outer surface of the lug 38 will engage with the complementarily beveled inner wall of an abutment 40 at the outer end of the recess 39 and will cooperate with the abutment to force the handle 31 fully to place in the slot $3^a$ and the projections 32 to place in the lock casing 33. The latch bolt 37 also will aid the projections 32 and the cooperating members of the lock which includes the casing 33 to prevent accidental upward swinging movement of the lever handle 31 from the position shown in Figure 3 and in addition, the handle 37 of the latch bolt will serve as a handle for swinging the lever handle 31 upward from position between the members $3^a$ when the projections 32 have been released from the associated lock and the latch bolt has been turned to position to disengage the abutment 40.

From the foregoing description of the various parts of the device, the operation thereof may be readily understood. When the lever handle 31 is in raised position as shown by the upper dotted lines in Figure 1, the movable section of the arm 2 will be at the inner end of its stroke and the roller 27 will rest on the curved edge of the camming arm 29 of the lever at the inner end of the camming arm, the edge of the camming arm 29 curving inward at the top of the camming arm 29 as indicated at 42 so that the weight of the roller 27 and the parts which are supported on the roller against the inwardly curved edge portion 42 of the camming member when the handle of the lever is raised will tend to prevent the lever handle from swinging downward accidentally. When the movable section of the arm 2 is at the inner end of its stroke, the effective length of the arm 2 will be less than that of each of the arms 1 and 3 and the heads 10, 16 and 20 at the outer ends of the respective arms 1, 3 and 2 may be placed in engagement with the inner periphery of the rim 14 or at least the heads 10 and 16 may be placed in engagement with the inner periphery of the rim 14 and the head 20 then will be close to the inner periphery of the rim and within the rim. The handle 31 of the lever then is swung downwardly from the upper position of Figure 1 to the lower position of Figure 1 and to the position shown in Figure 3. The roller 27 will ride from the inwardly curved portion 42 of the edge of the camming arm 29 of the lever along the convexly curved edge of the camming arm 29 of the lever and the movable section of the arm 2 will be forced outward in the guide passage 23, thus forcing the head 20 firmly against the rim 41. At the time, the roller 27 reaches the outer end of the camming arm 29 of the lever, the handle 31 of the lever will be entirely disposed in the slot 3ª of the arm 3 and the heads 10, 16 and 20 will be firmly clamped against the inner periphery of the rim 14 so that the rim 14 cannot be displaced from the seats 13, 16 and 21. The lever handle 31 then will be secured in its downwardly swung position by means of the hereinbefore mentioned locking and latching devices and the removal of the rim 14 and the tire thereon from the device will be prevented until the lever handle 31 shall have been released for upward swinging movement or until the supporting parts of the device shall have been broken. It will be observed that the downward pressure on the camming arm 29 when the handle 31 of the lever is in its downwardly swung position will be along the longitudinal median line of the camming member 29 and therefore this pressure will be sustained by the camming member 29 without placing any stress on the locking mechanism which holds the lever handle 31 in its downwardly swung position. To release the rim 14 from the carrier, it only is necessary to swing the lever handle 31 from the lower position of Fig. 1 to the raised position, which will permit the movable section of the arm to move downward and the rim then can be displaced from the rim engaging heads 10, 16 and 20. The movable section of the arm 2 can be adjusted as to length to adapt the carrier for use with a rim of any one of a plurality of different sizes. Also, it will be obvious that the device is adapted for use to expand a split rim during the operation of placing a tire on the rim.

If desired, the inner end member of the movable section of the arm 2 may be formed as shown at 50 in Figure 4 and may have the inner end thereof rounded transversely as indicated at 51 for sliding engagement with the edge of the camming arm 29 of the lever, the roller between the member 50 and the camming arm 29 of the lever then being omitted. The member 50 is provided with a reduced axial shank 52 which is threaded for engagement with the threaded bore 26 of the shank 22 in the same manner as the shank 25 of the member 24.

It will also be manifest that the heads at the outer ends of the arms 1, 2 and 3 may be formed with a plurality of seats similar to the seats 13, 19 and 21 in the outer faces thereof so that a plurality of rims may be held thereon. In Figure 6, I show a member 22ª′ similar to the member 22ª integral with a head 20ª formed with two juxtaposed seats 21ª for engaging with two of the rims 14. The head 20ª is integral with a member 22′ for engaging with the hereinbefore described stem 25 at the outer end of the member 24 of the movable section of the extensible arm of the device. Many other modifications and adaptations of the forms of the device illustrated in the drawings may be provided without departing from the spirit of the invention and I therefore consider as my own all such modifications and adaptations thereof as fairly fall within the scope of the appended claim.

I claim:—

In combination, a plurality of radially disposed arms one of which being tubular and rectangular in cross section, a slidable member in the tubular arm, a threaded shank carried thereby, a substantially rectangular tire rim engaging head adjustable longitudinally with respect to its arm, a rectangular sleeve projecting from the head and slidably received in the tubular arm and having an interiorly threaded bore threadedly receiving the stem, whereby the head may be adjusted longitudinally of the tubular arm upon moving said member in an outward direction until the rectangular sleeve has been moved beyond the tubular arm and rotating the sleeve on the stem, fixed tire engaging heads carried by the other arms, and means for moving said member in an outward direction within the tubular arm to engage the adjustable head with a tire arm.

EDWARD A. WALTERS.